March 25, 1952 E. A. FARR ET AL 2,590,600
ELECTRIC ROOM HEATER
Filed July 2, 1948 2 SHEETS—SHEET 1
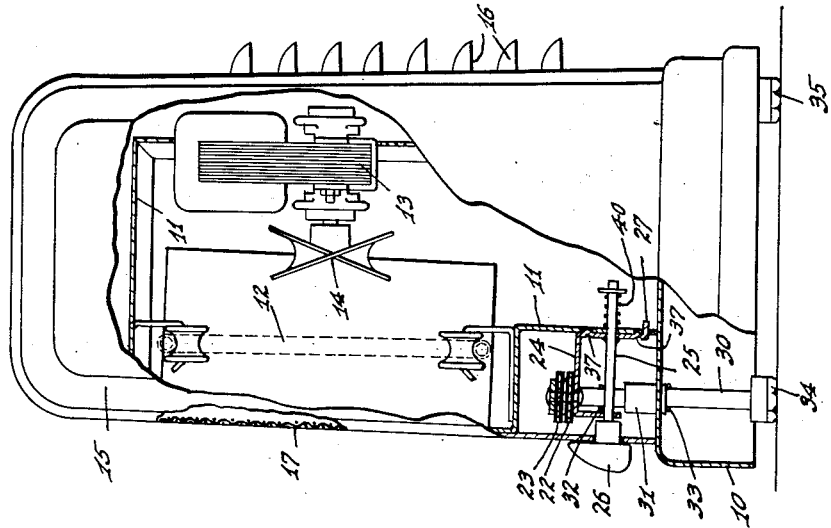
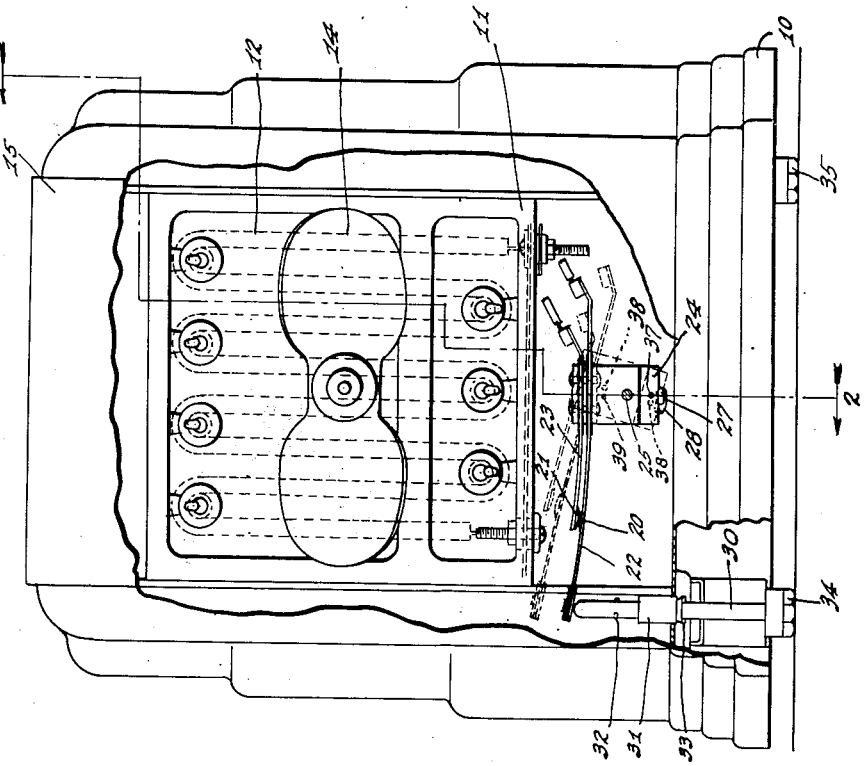
INVENTORS
EDWARD A. FARR and
JOHN P. THEISEN,
BY
ATTORNEYS

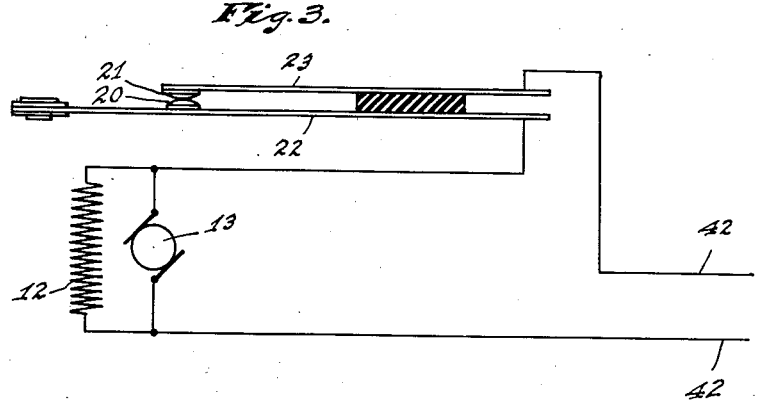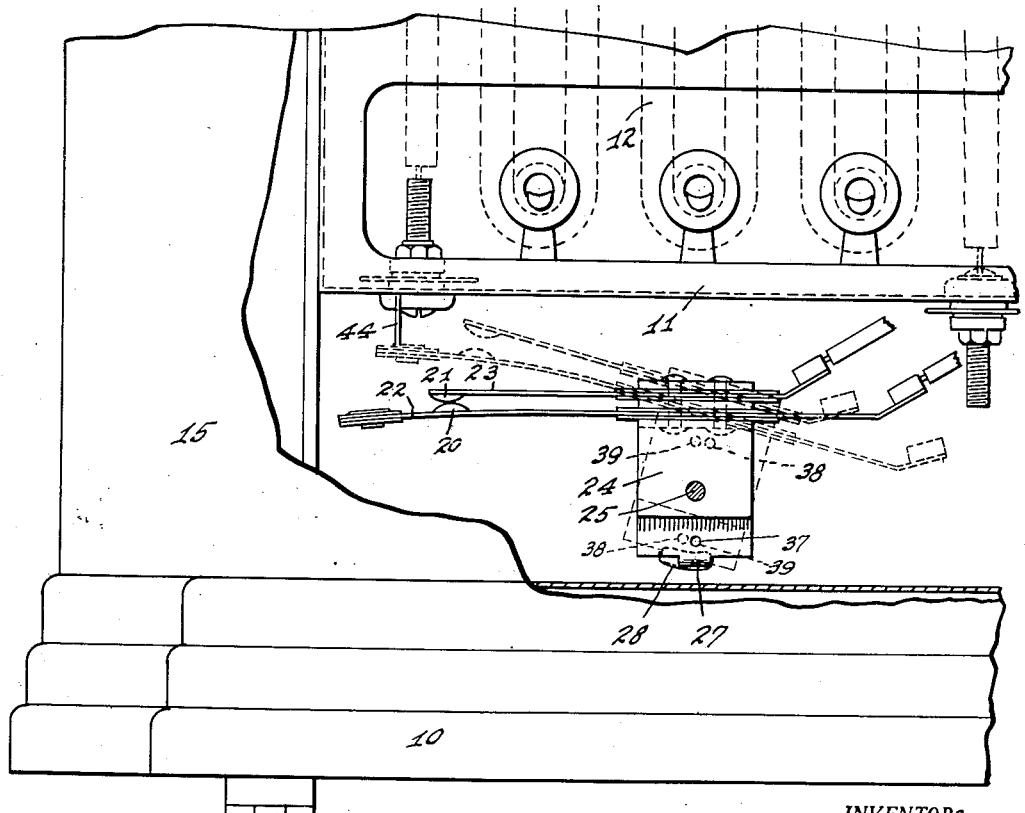

Patented Mar. 25, 1952

2,590,600

UNITED STATES PATENT OFFICE 2,590,600

ELECTRIC ROOM HEATER

Edward A. Farr and John P. Theisen, Columbus, Ind., assignors to Arvin Industries, Inc., Columbus, Ind., a corporation of Indiana Application July 2, 1948, Serial No. 36,684

7 Claims. (Cl. 219—39)

Our invention relates to room heaters of the type embodying an electrical resistance heating element, and more especially to a heater of the circulating type in which a motor-driven fan forces air over the heating element and discharges it into the room being heated. When such heaters are in use, it may happen that the air-discharge opening become occluded or that the motor fails to operate. In either of such circumstances, overheating results and creates the possibility of damage to the heater and perhaps the possibility of a fire.

It is the object of our invention to reduce the hazards incident to overheating of the heater resulting from a decrease in the rate at which heat is dissipated therefrom. More specifically, it is our object to shut off the supply of current to an electric room heater should the temperature of the heater attain or exceed a predetermined maximum. A further object of our invention is to provide means for preventing the supply of current to the heater when it is not in a normal upright position.

In carrying out our invention in its preferred form, we control the supply of electric current to the heater through a switch embodying a pair of contacts respectively mounted on generally parallel spring leaves, such switch being associated with operating mechanism by which one or the other of the leaves can be flexed to cause separation or engagement of the contacts. One of the leaves is made of bi-metal so that it will be temperature-responsive and will flex under the influence of elevated temperatures to separate the two switch contacts. In one embodiment of our invention, the contacts are separated when the associated leaves are unstressed, and the switch is closed by moving the leaves to cause one of them to engage and urge downwardly a vertically movable member which in turn is adapted to engage the floor or other supporting surface on which the heater rests. Should a heater embodying such a switch be tipped over, the vertically movable member would be out of engagement with the floor or other supporting surface and would hence be incapable of opposing the force exerted on it by the associated spring-leaf; and as a result, the switch would open.

The accompanying drawings illustrate our invention:

Fig. 1 is a front elevation of a room heater with portions thereof broken away to illustrate the interior construction; Fig. 2 is a vertical section on the line 2—2 of Fig. 1; Fig. 3 is a diagrammatic view illustrating electric connections; and Fig. 4 is a fragmentary view similar to Fig. 1 illustrating a modified construction.

The heater shown in the drawings comprises a generally rectangular base 10 to which there is attached an upwardly extending, sheet-metal frame 11. The frame 11 provides support for an electrical resistance heating element 12 and an electric motor 13, the latter being operatively connected to a fan 14 by which air is forced over the heating element 12. The frame 11 and the parts it carries are enclosed within a hollow casing 15 secured in any appropriate manner to the frame 11 or base 10. The casing 15 is formed in its rear wall with air-admitting openings provided by out-struck louvres 16 and in its front wall with an air-outlet opening or openings 17. The opening or openings 17, which may be covered with an appropriate foraminous screen or grill, are in alignment with the heating element 12; and as the fan 14 operates it draws air inwardly through the openings in the rear wall of the casing and discharges such air over the heating element 12 and out through the outlet opening 17. The heater as so far described is not novel.

In incorporating our invention in a heater of the type described, we employ a switch comprising co-operating contacts 20 and 21 respectively mounted on resilient contact-supporting leaves 22 and 23. In the particular arrangement illustrated in the drawings, the leaves 22 and 23 are insulated from each other and mounted on a U-shaped bracket 24 carried by a rock shaft 25. As will be clear from Fig. 2, the rock shaft 25 carries at its front end an operating knob 26 which is rotatably supported in the front wall of the casing 15, while the rear end of the rock shaft 25 extends through a portion of the frame 11, by which it is rotatably supported. The rear leg of the bracket 24 is provided with a rearwardly bent finger 27 which extends into an arcuate slot 28 in the frame 11 to limit the angle through which the shaft 25 may be rocked.

For the purpose of controlling engagement and separation of the contacts 20 and 21 as a result of rocking movement of the shaft 25 and bracket 24, one of the switch-leaves 22 and 23 projects beyond the other for co-operation with an abutment. In the embodiment of the invention illustrated in Figs. 1 and 2, the switch-leaf 22 projects beyond the switch leaf 23 for co-operation with a rod 30 mounted for limited vertical sliding movement in the base 10. Conveniently, the base 10 is provided with a sleeve 31 which slidably receives the rod 30, and the rod 30 is provided with spaced abutments 32 and 33 which limit movement of the rod in the sleeve. At its lower end, the rod 30 carries a foot 34 which, in the upper position of the rod, is co-planar with other heater-supporting feet 35 fixedly mounted on the base 10. The switch-leaves 22 and 23 are so shaped that when unstressed the contacts 20 and 21 are separated. Accordingly, when the switch-leaf 22 is out of engagement with the rod 30, the switch contacts 20 and 21 are separated, as indicated in dotted lines in Fig. 1; but if the operating knob 26 is moved to rotate the shaft 25 in a counter-clockwise direction, the outer end of the leaf 22 engages the upper end of the rod 30, and continued rotation of the shaft 25 causes the contact 21 to engage the contact 20.

For the purpose of holding the shaft 25 with the switch-leaf 22 either in or out of engagement with the upper end of the rod 30, the bracket 24 may be provided with rearwardly extending bosses 37 each adapted to be received in either of two holes 38 and 39 in the frame 11; and the shaft 25 is mounted for axial movement and urged rearwardly by a compression spring 40 acting between it and the frame 11. In the open position of the switch, shown in dotted lines in Fig. 11, the projections 37 are received in the openings 38, and the bracket 24 is thus releasably held in a position such that the spring-leaf 22 will be out of engagement with the rod 30 and the contacts 20 and 21 separated. To close the switch, the knob 26 is moved to rotate the shaft 25 in a counter-clockwise direction, the spring 40 yielding and permitting such forward movement of the shaft 25 as is necessary to permit the projections 37 to clear the openings 38. The angular interval between the openings 38 and 39 about the axis of the shaft 25 is such that the projections 37 cannot enter the openings 39 until after the switch-leaf 22 has engaged the upper end of the rod 30 and has been flexed far enough to cause engagement of the contacts 20 and 21.

In accordance with our invention, the shorter switch-leaf 23 is in the form of a bi-metal strip so arranged that when subjected to an increase in temperature it tends to bend upwardly and separate the contact 21 from the contact 20. The parts are so proportioned that in the normal operation of the heater any upward flexing of the leaf 23 as a result of the temperature existing under such normal operation will not be sufficient to cause the contact 21 to move out of engagement with the contact 20. However, if the air-outlet opening 17 becomes occluded or if, for any reason, the motor 13 ceases to operate, the temperature of the heater will rise as a result of the decrease in the rate at which heat is dissipated from it. Such temperature-rise will cause the bi-metal leaf 23 to bend upwardly far enough to separate the contacts 20 and 21. As will be clear from Fig. 3, the contacts 20 and 21 constitute a switch controlling the supply of current to the heating element 12 and motor 13 from supply lines 42, and when the contacts 20 and 21 are separated, the supply of current to the heating element and motor is interrupted.

It will be clear from the above description that the switch 20—21 is maintained closed by reason of upward reaction of the rod 30 on the outer end of the switch-leaf 22. When the heater is in upright position with the feet 34 and 35 resting on the floor or other supporting surface, downward movement of the rod 30 under the influence of force exerted on it by the spring 22 is prevented; but if the heater should become upset, the foot 34 would no longer be in contact with the floor, and the rod 30 would therefore be incapable of acting on the switch-leaf 22 with a force sufficient to overcome its elasticity and maintain the contacts 20 and 21 in engagement. Accordingly, the switch-leaf 22 would assume its normal or unstressed position, and the contact 20 would be carried out of engagement with the contact 21 to interrupt the supply of current to the heating element and motor.

In the modified arrangement illustrated in Fig. 4, the switch-leaves 22 and 23 are so arranged as to hold the contacts 20 and 21 in engagement with each other when the switch leaves are unstressed, and an abutment 44 is mounted on the frame 11 in position to engage the outer end of the lower switch-leaf 22 and cause separation of the contacts 20 and 21 when the leaf-supporting bracket 24 is moved in a clockwise direction. The detent device, comprising projections 37, the openings 38 and 39, and the spring 40 operates to hold the bracket 24 either in the full-line or the dotted-line position shown in Fig. 4. In the full-line position, the outer end of the switch-leaf 22 is out of engagement with the abutment 44 and the two contacts 20 and 21 engage each other to complete the circuit through the heating element 12 and motor 13. By moving the operating knob 26, however, to rock the bracket 24 in a clockwise direction the spring-leaf 22 is caused to engage the abutment 44 to cause a separation of the contacts 20 and 21.

As in the construction previously described, the switch-leaf 23 is of bi-metal arranged to flex upwardly upon an increase in temperature. The switch mechanism therefore operates as does that shown in Figs. 1 and 2 to cause an interruption of the supply of current to the motor and heating element when the temperature of the heater rises sufficiently to cause the bi-metal switch-leaf to flex upwardly and separate the contacts 20 and 21.

In both switch modifications shown the larger switch-leaf 22 is stressed when the contacts 20 and 21 are in engagement, the stress being such as will urge the contact 20 toward the contact 21. The stress in the leaf 22 is great enough to cause the contact 20 to follow and remain in engagement with the contact 21 under such movement of the latter as results from temperature-induced flexing of the leaf 23 under all normal operating temperatures. However, the stress in the leaf 22 is not great enough to cause the contact 20 to follow the contact 21 when the leaf 23 flexes in response to temperatures high enough to cause dangerous overheating.

We claim as our invention:

1. In an electric room heater, a frame, an electrical resistance heating element supported from said frame, feet for supporting said frame from a horizontal supporting surface, a vertical rod bearing one of said feet at its lower end and mounted in said frame for sliding movement downwardly relative to the frame from a normal position in which the associated foot is co-planar with the remaining feet, and switch means for controlling the supply of current to said heating element, said switch means comprising a support, upper and lower flexible leaves mounted on said support, switch contacts carried by said leaves, said leaves when unstressed supporting said contacts in spaced relation, said support being swingable to force the lower leaf downwardly against the upper end of said rod whereby to flex the lower leaf to cause interengagement of the contacts and the application of a downwardly directed force to said rod, and releasable means for holding the support against movement as a result of the reaction of the lower leaf upon it.

2. A heater as set forth in claim 1 with the addition that said upper leaf is of bi-metal arranged to flex upwardly and separate the contacts upon an increase in temperature.

3. In an electric heater adapted to rest on a horizontal supporting surface, a frame, an electrical resistance heating element, an abutment movably supported from said frame, a normally open switch including a yieldingly mounted element movable into engagement with said abutment to close the switch, said switch controlling the supply of current to said heating element, a member movably supported from the frame to engage the supporting surface and movable downwardly relative to the frame from the position it occupies when in engagement with surface, and an operative connection between said member and abutment, the parts being so constructed and arranged that the yieldingly mounted switch element acts on the abutment, when the switch is closed, to urge said member downwardly relative to the frame.

4. In an electric heater adapted to rest on a horizontal supporting surface, a frame, an electrical resistance heating element, normally open switch mechanism for controlling supply of current to said heating element, and means movable relative to said frame and adapted to act on said switch mechanism to cause closing thereof while reacting downwardly on the supporting surface, said switch mechanism including a temperature-responsive element for causing opening of the switch mechanism in response to temperatures higher than a predetermined maximum.

5. A heater as set forth in claim 4 with the addition of an electric motor controlled by said switch mechanism, and a fan driven by said motor to force air over said heating element.

6. In an electric heater, a frame, an electrical resistance heating element, and switch mechanism for controlling supply of current to said heating element, said switch mechanism including two leaves of resilient material and co-operating contacts on said leaves, a common support for said leaves, said contacts being relatively movable into and out of engagement with each other by flexing of said leaves, one of said leaves being of temperature-responsive bi-metal arranged to flex and separate said contacts when its temperature rises above a predetermined maximum, said support being movably mounted on said frame, and an abutment disposed in the path of movement of one of said leaves as the support is moved for engaging such leaf and effecting relative movement of said contacts.

7. A heater as set forth in claim 6 with the addition that said leaves normally hold the contacts out of engagement with each other, said abutment being positioned to interrupt the movement of the leaf it engages and effect interengagement of said contacts upon movement of said support in one direction.

EDWARD A. FARR.
JOHN P. THEISEN.

REFERENCES CITED

The following references are of record in the file of this patent:

UNITED STATES PATENTS

| Number | Name | Date |
|---|---|---|
| 799,377 | Harden | Sept. 12, 1905 |
| 1,064,358 | Mettler | June 10, 1913 |
| 1,484,156 | Phelan | Feb. 19, 1924 |
| 1,956,067 | Herz | Apr. 24, 1934 |
| 2,008,163 | Walder | July 16, 1935 |
| 2,020,364 | Lehmann | Nov. 12, 1935 |
| 2,020,538 | Denison | Nov. 12, 1935 |
| 2,061,258 | Soverhill | Nov. 17, 1936 |
| 2,190,276 | Smith | Feb. 13, 1940 |
| 2,248,666 | Fischer | July 8, 1941 |